Figure 2:
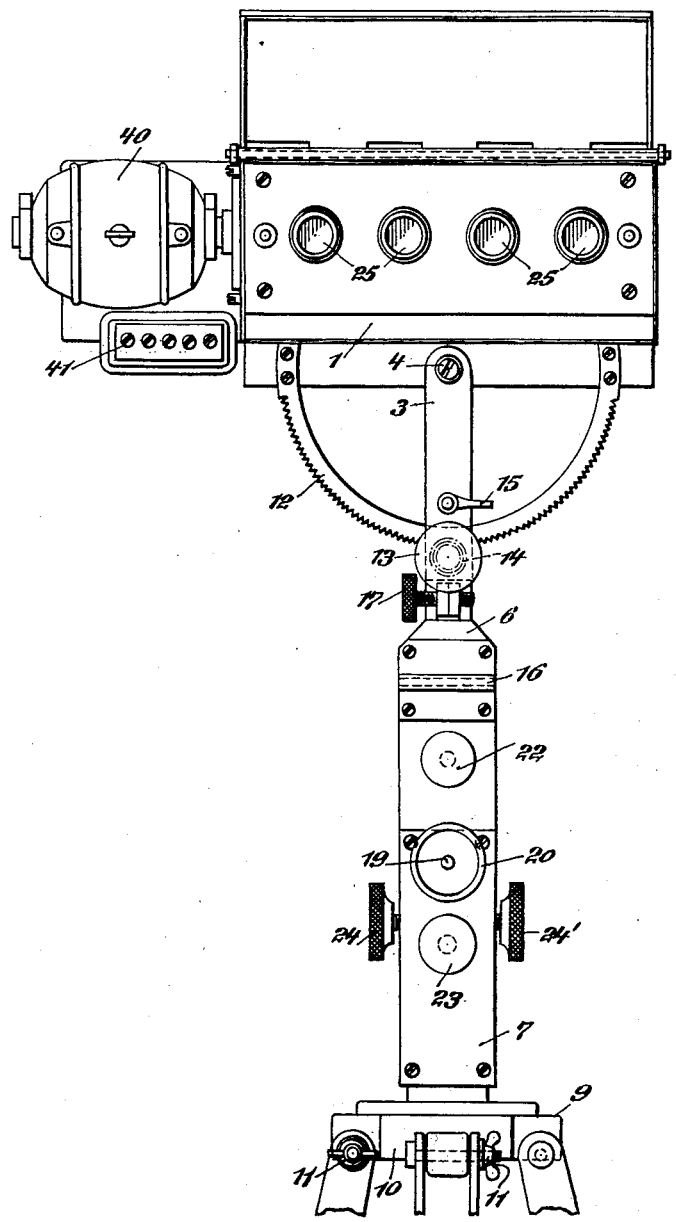

July 15, 1924.
F. DUDA
1,501,842
CAMERA FOR PHOTOGRAPHING QUICKLY MOVING OBJECTS
Filed April 2, 1923   2 Sheets-Sheet 1
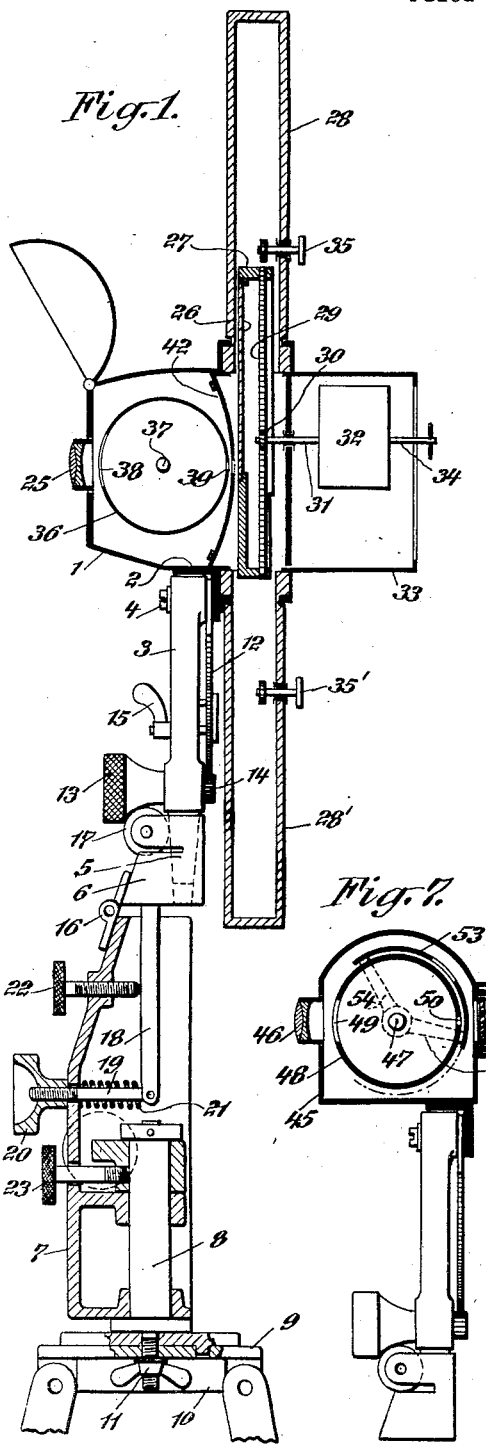
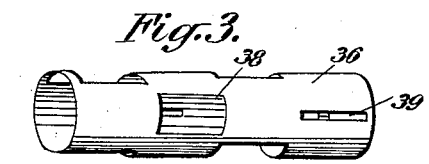
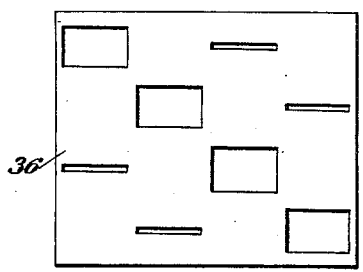
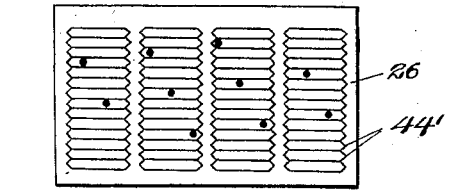
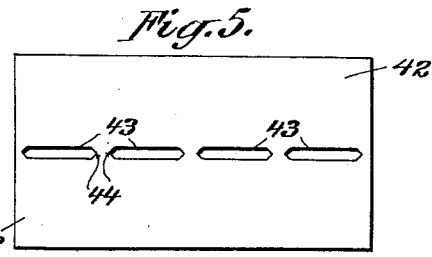
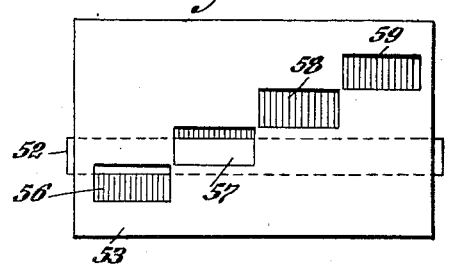
Inventor
F. Duda,
By Marks & Clerk
Attys.

Patented July 15, 1924.

1,501,842

UNITED STATES PATENT OFFICE.

FRANZ DUDA, OF VIENNA, AUSTRIA.

CAMERA FOR PHOTOGRAPHING QUICKLY-MOVING OBJECTS.

Application filed April 2, 1923. Serial No. 629,478.

*To all whom it may concern:*

Be it known that I, FRANZ DUDA, a citizen of the Republic of Austria, and residing at Vienna, Austria, have invented certain new and useful Improvements in a Camera for Photographing Quickly-Moving Objects, of which the following is a specification.

Devices are already known by means of which the speed of rapid movements is measured by means of two or more photographs taken at successive known intervals of time. Heretofore, the photographs have been made either with two cameras or with a single camera, by measuring the speed of movement of a slot shutter. However, the second method, which is practically the only one used at present, does not give such accurate results as desired. Rotary shutters provided with radial slots arranged irregularly in concentric rows do, indeed, prevent over-exposure of the plate, but render more difficult the attainment of accurate measuring results. The same also applies to such arrangements in which the image of the moving object appears as a spiral curve on a sensitized plate which is set in rotation and whereby the speed is determined by the form of said curve.

In the present invention the shutter employed in a light-impermeable drum arranged between the lenses and the sensitized plate and provided with a large opening and a parallel slot positioned diametrally opposite the axis of said drum, and set in regular rotation. In order to prevent the necessary uniform advance of the image surfaces during this movement, the image fields corresponding to the individual lenses are released successively by means of a suitable constructed shutter, so that the released portions of the image fields of the different lenses to be exposed unite, at the same time, into a complete image field, a point occurring in the image field which must thus be taken up by one or the other of the lenses.

The subject of the invention is illustrated by way of example on the accompanying drawing, in which Fig. 1 is a vertical section through the optical axis of a lens and the support of the apparatus. Fig. 2 is a front elevation thereof. Fig. 3 is a perspective view of the shutter. Fig. 4 is an extended plan thereof. Fig. 5 is an elevational detail of the screen. Fig. 6 is an elevational detail of the sensitized surface with the photographic reproductions of a point moved rapidly before the four lenses of the camera. Fig. 7 is another embodiment of the apparatus with stationary image surfaces in cross section through the optical axis of a lens; and Fig. 8 shows the shutter extended.

A photographic camera is tiltably mounted by means of an angle member 2, extending over its entire width, on an arm 3 about a pivot pin 4. The arm 3 terminates in a pin 5 which is inserted in the upper part 6 of a support, whose lower arm 7 has a pivot pin 8, which extends through the plate 9 of a tripod 10 and has threads to screw on a butterfly nut 11. Attached to the angle member 2 is a gear segment 12 which is engaged with a slot or forked member 14 journaled on the arm 3 and adapted to be actuated by means of the hand wheel 14. The segment 12 may be adjusted in the desired position by means of an adjusting lever 15. The two parts 6 and 7 of the support are connected by means of a hinge 16. The part 6 is provided with a clamp screw 17 for tightening the pin 5, and an arm 18 whose end is connected with a screw bolt 19 journaled in the part 7, said screw bolt having a lock nut 20. A spring 21 constantly forces the arm 18 inwardly, as far as permitted by the nut 20, a lock nut 22 completing the fixation in the position desired. When the butterfly nut 11 and the clamp screw 23 are raised, the support may be swung manually about the pivot 8. Precision adjustment is also provided by means of the micrometer screws 24, 24'. It is to be expressly understood that the foregoing mounting for the camera is of a conventional and well known construction, forming no part of this invention. It is not claimed and is shown merely to facilitate a quick understanding of the actual use of the camera per se.

Four lenses 25 are arranged adjacent to each other on the camera 1, said lenses 25 having parallel axes, and opposite which is positioned a correspondingly wide sensitized plate 26 is a frame 27. The frame 27 is slidably mounted perpendicular to the axes of the lenses and is adapted to move inside an upper and lower casing 28, 28'. For moving the frame a rack 29 is attached thereto, in which a small gear 30 engages, said gear being mounted at the end of the drive shaft 31 of a clockwork 32, which is placed in a housing 33 and may be wound by means of a key 34.

Hand wheels 35, 35' serve for actuating the frame 27 manually before or after engagement of the rack 29 and the gear 30.

Between the lenses 25 and the plate 26 a drum 36, of light-impermeable material, is arranged on a shaft 37 in such manner that the axis of the drum is perpendicular to the optical axes of the lenses and lies in the plane determined thereby. The drum (Figs. 1, 3, 4) is provided with diametrically opposed broad and narrow slots 38 and 39 for each of the objectives respectively. These pairs of slots are so displaced on the periphery of the drum that after each quarter revolution of the drum the path to the image or sensitized surface is opened for the passage of the light rays thereto. Exposure takes place, naturally, only at that point at which the wide slot is exactly behind the lens, there being no appreciable exposure at the opposite position, this being the particular function of the openings and slot 38 and 39. Placed on one side of the camera is an electric motor 40 with plug contacts 41, which serve to control the movement of the drum. Arranged between the drum 36 and the plate 26 is a screen 42 (Figs. 1 and 5) which has four slots 43 corresponding to the four lenses, which are provided with V-shaped exposure corners 44.

When the plate 26 is moved downwardly on sufficiently rapid rotation of the drum 36 through the clockwork 32, the images of each exposure appear under each other, corresponding to the four lenses in four adjacent rows. The dots 45' indicated on Fig. 6 indicate the location of the projectile or other moving object as it is caught by the lens at each exposure of the sensitized plate. The individual exposures may be distinguished, one from the other by the marks 44' produced by the V-corners 44.

If the apparatus is intended, for example, for measuring the velocity of an artillery projectile, the operation is as follows:

The apparatus, as usual with optical instruments (not shown), is set up by means of a diopter parallel with the direction of fire, so that the optical axes of the lenses lie in planes perpendicular to the plane of the path of the projectile. The necessary inclination of the optical axes is effected by means of the adjusting nut 20 and the set screw 22, and fixed. If the projectile is fixed at an angle other than 0°, suitable inclination is effected by a reading on the arc or segment 12 and a checking or arresting operation is accomplished by means of the lever 15 in a manner similar to the adjustment of a piece of ordnance. The result is that the portion of the trajectory involved appears accurately in the symmetrical lines of the plane, which is parallel to the axis of the drum 36 and thus also parallel to its narrow slot 39.

The adjustment of the image field is effected in the same manner as usual with photographic instruments, by carrying the drum 36 to the position shown on Fig. 1. The plate frames 37 are now inserted in the casings 28 and these slide laterally in their guides into the camera 1. The empty casing 28' is likewise inserted at the lower side of the camera. By means of the hand wheel 35, the frame 37 is moved or advanced until its rack 28 engages the gear 30 or the clockwork 32. The latter is then wound and the motor 40 connected by means of its plug contact 41 with a current source, so that the drum is set in rotation. On complete revolution thereof the clockwork 32 is set going and the connection at the same time cut off, so that the frame or casing 28 moves downwardly at the same time.

As soon as the frame 27 has passed into the lower casing 28' the operation of the motor can be checked. By turning the wheel 35' the frame 27 is entirely drawn into the lower casing 28' and may be removed therewith for developing the plate.

On the developed plate it is possible to measure the intervals of each two successive projectile pictures or images coming from the same objective, and to determine the velocity of the projectile from the average value thus obtained, taking into account the rotational speed of the drum 36 and the focal distance of the objectives.

In the embodiment showing the stationary image surfaces, according to Figs. 7 and 8, provision is made so that image fields corresponding to the individual lenses are successively released by a suitably constructed shutter aranged concentrically wth the axis of the drum 36 so that the separate parts of the image field are united to form one whole field.

Since the construction of the support for the camera is exactly the same as described in connection with the arrangement shown in Figs. 1 and 2, the camera per se is shown only in cross section on Fig. 7.

As described in the preceding, the camera 45 has four lenses 46 and, on an axis, a drum 48 with the wide and narrow slots 49 and 50 respectively. Opposite the lenses, in suitable guides of the rear wall, the plate frames 51 with the sensitive plates 52 are slid in laterally. The drum 48 is covered partly by a concentrically arranged shutter 53 forming part of a cylindrical surface and supported laterally by arms 54, 55, which are mounted or journaled in the lateral walls of the camera. While a motor not shown is adapted to be arranged on the one lateral wall of the camera for driving the drum 48, on the other side there is a clockwork (not shown) for actuating the shutter 53. The shutter is about as wide as the plate 52 which is either of one piece or assembled of four parts corresponding to the image fields of the four lenses. The shutter 53 has four checkerboard, staggered, rectangular openings 56, 57, 58, 59, whose dimensions are identical with those of an image field, as shown on Fig. 8, where the shutter is shown rolled up. At the upper and lower edges of the shutter there is left a strip passing therethrough whose width is equal to the height of the plate 52, so that it covers the plate completely in the position shown in full and in dotted lines.

Like the frames 27 of the first embodiment, in the present case, the shutter 53 is adapted to be set in movement by the clockwork simultaneously with the firing of the shot. It moves from the position shown in full lines into the end position shown in dotted lines, so that the plate 52, as in the first embodiment is exposed stepwise, overexposure thus not being able to take place. In the present case there is only one stepped series of images or pictures.

On Fig. 8, the plate 52 is indicated in a relative position with respect to the shutter 53, in which two image fields of the plate is partially covered by the shutter. Nevertheless no photographic view is lost, as the parts of the image field laid free for exposure unite to a whole image field, and the view of an object coming in the scope of the objective must thus be made on one or the other exposed parts of the parts of the two image fields. By reason of the arrangement of the movable shutter 53 it will be unnecessary to move the plate, which simplifies the construction.

Having thus fully described the invention what is claimed and desired to be secured by Letters Patent is:—

1. In a camera of the character described, the combination with a horizontal row of lenses, a rotatable drum-like shutter arranged behind the lenses and having its axis parallel to and in the same horizontal plane of the lenses, the shutter having for each lens a large opening and a relatively narrow slot diametrically opposite the opening, the openings and also the slots being arranged in spiral relation, substantially as and for the purposes set forth.

2. A camera in accordance with claim 1, wherein a shield is arranged adjacent the drum and opposite the lenses and is provided with openings coaxial with the optical axes of the lenses, guides arranged rearwardly of the shield and substantially tangentially with respect to the shutter, a sensitized plate carrying frame movable vertically in the guides, and means for synchronously actuating the plate frame with respect to the rotation of the shutter, substantially as and for the purposes set forth.

3. A camera in accordance with claim 1 wherein guides are arranged substantially tangentially and rearwardly of the drum, a plate frame movable vertically in the guides, and a clockwork for synchronously actuating the plate frame with respect to the rotation of the shutter, substantially as and for the purposes set forth.

In testimony whereof I hereunto affix my signature.

FRANZ DUDA.

Witnesses:
KARL WIRTTENBERG,
FRZ. KARLEMAYER.